United States Patent
Smith et al.

(10) Patent No.: US 10,120,798 B1
(45) Date of Patent: Nov. 6, 2018

(54) DYNAMIC FPGA RE-CONFIGURATION USING A VIRTUAL FPGA CONTROLLER

(71) Applicant: Intel Corporation, Santa Clara, CA (US)

(72) Inventors: Ned M. Smith, Beaverton, OR (US); Rajesh Poornachandran, Portland, OR (US); Abdul M. Bailey, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/619,864

(22) Filed: Jun. 12, 2017

(51) Int. Cl.
  *G06F 12/08* (2016.01)
  *G06F 9/30* (2018.01)
  *G06F 15/78* (2006.01)

(52) U.S. Cl.
  CPC .......... *G06F 12/08* (2013.01); *G06F 9/30181* (2013.01); *G06F 15/78* (2013.01); *G06F 15/7803* (2013.01); *G06F 15/7867* (2013.01); *G06F 2212/253* (2013.01)

(58) Field of Classification Search
  CPC ...... G06F 12/08; G06F 9/30181; G06F 15/78; G06F 15/7803; G06F 15/7867
  USPC ......................................................... 326/39
  See application file for complete search history.

(56) References Cited

U.S. PATENT DOCUMENTS

| 6,871,341 | B1* | 3/2005 | Shyr | G06F 8/4441 |
| | | | | 712/227 |
| 2002/0112091 | A1* | 8/2002 | Schott | G06F 9/54 |
| | | | | 719/328 |
| 2004/0060032 | A1* | 3/2004 | McCubbrey | G06F 17/5054 |
| | | | | 716/104 |
| 2017/0262567 | A1* | 9/2017 | Vassiliev | H03K 19/17704 |
| 2017/0264680 | A1* | 9/2017 | Palermo | H04L 67/1031 |
| 2017/0323045 | A1* | 11/2017 | Huang | G06F 17/5054 |

* cited by examiner

*Primary Examiner* — Dylan White
(74) *Attorney, Agent, or Firm* — Barnes & Thornburg LLP (57) ABSTRACT

Technologies for field-programmable gate array (FPGA) processing include a computing device having a field-programmable gate array (FPGA) and a virtual FPGA controller (VFC). The computing device generates a user-specific platform profile (PP) that identifies one or more FPGA applications to be instantiated. The computing device synthesizes each FPGA application identified by the PP to generate a bit stream image that is associated with the PP and saves the bit stream image in a profile storage of the computing device. The computing device generates a virtual memory address that is indicative of the identified FPGA applications in response to saving the bit stream image. The VFC translates the virtual memory address to a user segment of the FPGA and a logical element (LE) offset within the user segment. The FPGA executes the bit stream associated with the PP with the FPGA at the LE offset. Other embodiments are described and claimed.

24 Claims, 6 Drawing Sheets

DYNAMIC FPGA RE-CONFIGURATION USING A VIRTUAL FPGA CONTROLLER

BACKGROUND

Field-programmable gate arrays (FPGAs) are increasingly being used for rapidly deployed custom workloads and accelerators. FPGAs may be configured to accelerate a variety of custom workloads such as media, graphics processing, cryptography, analytics, machine learning, and others.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
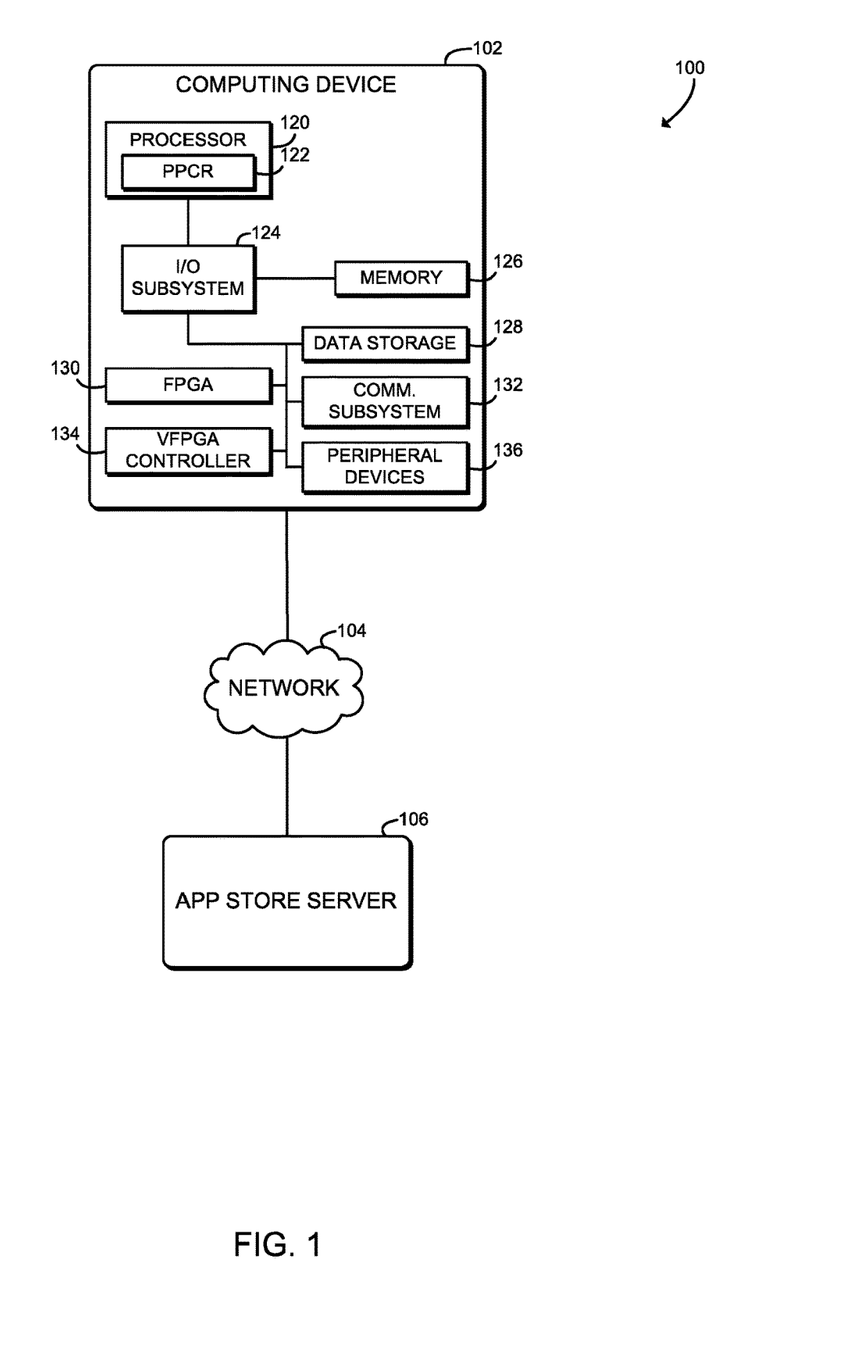
FIG. 1 is a simplified block diagram of at least one embodiment of a system for dynamic field-programmable gate array (FPGA) reconfiguration using a virtual FPGA (VFPGA)

Referring now to FIG. 1, an illustrative system 100 for dynamic field-programmable gate array (FPGA) re-configuration includes a computing device 102, a network 104, and an app store server 106. Although FIG. 1 shows only one computing device 102, there may be any number of computing devices 102 that may be connected through the network 104. User environments may include a mix between cloud-hosted and client-hosted applications. As a result, users are increasingly unable to distinguish where physically a workload is hosted or executed. However, users expect the same user experience regardless of which platform is used to host their workloads. In use, as described below, the computing device 102 receives one or more FPGA application listings or recommendations from the app store server 106 through the network 104. A FPGA binary file may be downloaded from the app store server 106 to utilize hardware FPGA capabilities of the computing device 102. An FPGA 130 of the computing device may be configured to accelerate a variety of custom workloads such as media, graphics processing, cryptography, analytics, machine learning and others. The FPGA may also be used for computing functions such as storage and communications and others. The FPGA binary files that are downloaded from the app store server 106 are for accelerating a variety of workloads with the FPGA 130. The user's workload may be scheduled for execution on the computing device 102 or another computing device 102 that is embodied as a cloud server or a combination of devices 102 using a distributed computing mechanism. Thereby, the workload may be shared among several computing devices 102. The system 100 may also take a second user's application profile that contains the second user's workload to reconfigure the FPGA 130 of the computing device 102 after completion of the first user's workload. There may be any number of user workloads that the system 100 may handle and reconfigure the FPGA 130 of the computing device 102 or several computing devices 102. The system 100 may decrease latency in dynamic FPGA 130 re-configuration and allows for a per-user customization by utilizing user-specific platform profiles. Furthermore, the system 100 may provide customization that allows for a per-user platform configuration across all devices of a data center. Thus, the system 100 may dynamically enable and execute subsets of workloads on a virtual resource by reconfiguring the virtual resource in real-time to optimize hardware behavior for a given capability.

In one embodiment, the system 100 may anticipate caching and paging/swapping for improved context switch acceleration. Accordingly, VFPGA behavioral analytics across several computing devices 102 may be mined using machine learning analytics algorithms. The learned knowledge/inference from latencies from crowd-sourced computing devices 102 along with workload characteristics may be employed for efficient context switch association/optimization. That is, the system 100 may gather and analyze data from several computing devices to improve context switching. The communication can be embodied as a dedicated out-of-band trusted execution environment (TEE) channel to protect the integrity, security, and privacy of the users.

The computing device 102 may be embodied as any type of computation or computer device capable of performing the functions described herein, including, without limitation, a computer, a server, a rack-mounted server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively includes a processor 120, an input/output subsystem 124, a memory 126, a data storage device 128, a FPGA 130, a communication subsystem 132, a virtual FPGA (VFPGA) controller 134, and peripheral devices 136, and/or other components and devices commonly found in a server computer or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 includes a platform profile context register (PPCR) 122. The PPCR 122 may identify user segments within the FPGA 130, where each user segment contains a user-specific platform profile as described below. The memory 126 may be embodied as any type of volatile or non-volatile memory or data storage capable of performing the functions described herein. In operation, the memory 126 may store various data and software used during operation of the computing device 102 such operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 102. For example, the I/O subsystem 124 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 102, on a single integrated circuit chip. Additionally, the PPCR 122 is shown to be incorporated into the processor 120, but in some embodiments the PPCR 122 may be separate from the processor 120.

The data storage device 128 may be embodied as any type of device or devices configured for short-term or long-term storage of data such as, for example, memory devices and circuits, memory cards, hard disk drives, solid-state drives, non-volatile flash memory, or other data storage devices. The computing device 102 may also include a communications subsystem 132, which may be embodied as any communication circuit, device, or collection thereof, capable of enabling communications between the computing device 102 and other remote devices over the network 104. For example, the communications subsystem 132 may be embodied as or otherwise include a network interface controller (NIC) for sending and/or receiving network data with remote devices. The communications subsystem 132 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

As shown in FIG. 1, the computing device 102 includes a field-programmable gate array (FPGA) 130. The FPGA 130 may be embodied as an integrated circuit including programmable digital logic resources that may be configured after manufacture. The FPGA 130 may include, for example, a configurable array of logic blocks in communication over a configurable data interchange. The FPGA 130 may be coupled to the processor 120 via a high-speed connection interface such as a peripheral bus (e.g., a PCI Express bus) or an inter-processor interconnect (e.g., an in-die interconnect (IDI) or QuickPath Interconnect (QPI)), via a fabric interconnect such as Intel® Omni-Path Architecture, or via any other appropriate interconnect. The computing device 102 includes a VFPGA controller 134. The VFPGA controller 134 may be embodied as any controller, functional block, digital logic, application-specific integrated circuit (ASIC), or other component capable of performing the functions described herein. As described further below, the VFGPA controller 134 may implement some functions similar to a memory management unit (MMU) as well as functions of FPGA segmentation and FPGA programming In some embodiments, an existing MMU may incorporate the VFPGA controller 134 such that a single MMU may perform memory virtualization tasks as well as virtualizing and segmenting FPGA logical elements.

In some embodiments, the FPGA 130 and the VFPGA controller 134 may be capable of communicating via one or more common direct memory access (DMA) buffers. Additionally, although illustrated in FIG. 1 as discrete components separate from the processor 120 and/or the I/O subsystem 124, it should be understood that in some embodiments one or more of the FPGA 130, the VFPA controller 134, the processor 120, the I/O subsystem 124, and/or the memory 126 may be incorporated in the same package and/or in the same computer chip, for example in the same SoC. As another example, in some embodiments the FPGA 130 and the VFPGA controller 134 may be included together in a hybrid offload engine.

The computing device 102 may further include one or more peripheral devices 136. The peripheral devices 136 may include any number of additional input/output devices, interface devices, and/or other peripheral devices. For example, in some embodiments, the peripheral devices 136 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

As shown in FIG. 1, the system 100 includes a network 104. The network 104 may be embodied as any type of network capable of facilitating communications between the computing device 102 and the app store server 106 and/or other remote devices. For example, the network 104 may be embodied as, or otherwise include, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications thereacross.

As further shown in FIG. 1, the system 100 includes an app store server 106. The app store server 106 may be configured to send one or more FPGA application listings or recommendations to the computing device 102. The app store server 106 may be configured to facilitate a purchase with the computing device 102 for both traditional applications and Dynamic FPGA aware applications that may comprise FPGA binaries. The app store server 106 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. The app store server 106 may include any components, such as those commonly found in a server device (e.g., various input/output devices), in other embodiments.

Figure 2:
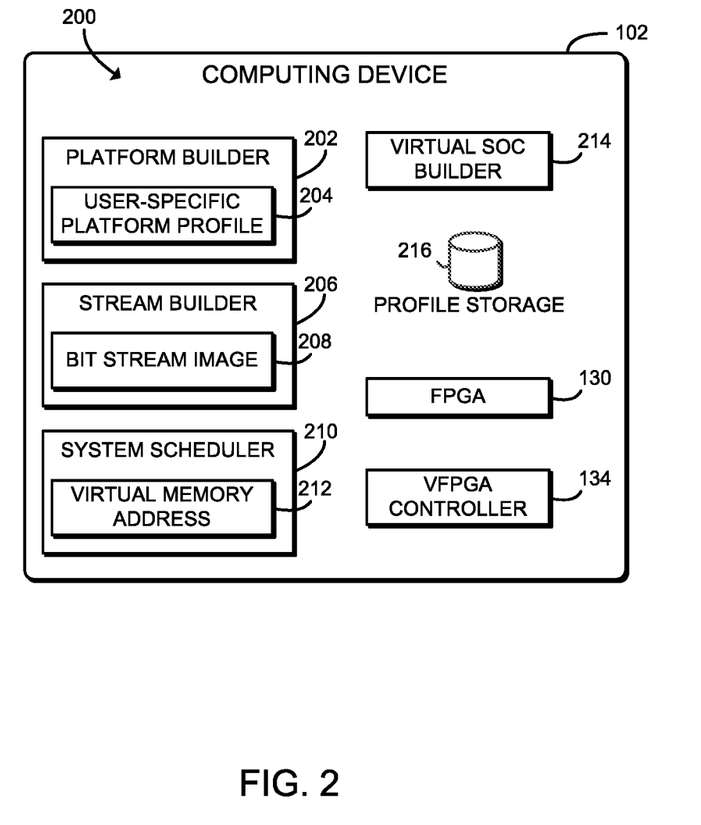
FIG. 2 is a simplified block diagram of at least one embodiment of an environment of a computing device of FIG. 1.

Referring now to FIG. 2, in an illustrative embodiment, the computing device 102 establishes an environment 200 during operation. The illustrative embodiment 200 includes a platform builder 202 to generate a user-specific platform profile 204, a stream builder 206 to generate a bit stream image 208, a system scheduler 210 to generate a virtual memory address 212, a virtual system-on-a-chip builder (VSB) 214, and a profile storage 216. The various components of the environment 200 may be embodied as hardware, firmware, software, or a combination thereof. As such, in some embodiments, one or more of the components of the environment 200 may be embodied as circuitry or collection of electrical devices. It should be appreciated that, in such embodiments, one or more of the platform builder 202, the stream builder 206, the system scheduler 210, the VSB 214, and/or the profile storage 216 may form a portion of the processor 120, the I/O subsystem 124, the FPGA 130, the VFPGA controller 134, and/or other components of the computing device 102. Additionally, in some embodiments, one or more of the illustrative components may form a portion of another component and/or one or more of the illustrative components may be independent of one another. Also, although illustrated as being established by a single computing device 102, in some embodiments the environment 200 may be established by several computing devices 102 in communication over the network 104.

The platform builder 202 is configured to manage one or more user-specific platform profiles 204 on behalf of one or more users that may have app store purchases from the app store server 106. The platform builder 202 may be embodied as a cloud service, mesh agent, or user process on the computing device 102. Each user-specific platform profile 204 may be generated and maintained by the platform builder 202. The user-specific platform profile 204 is a profile containing FPGA applications that the user may have purchased from the app store server 106 or that are otherwise associated with the user. Accordingly, the user-specific platform profile 204 may contain the workload to be executed by the computing device 102 or other computing devices 102. The user-specific platform profile 204 may be stored in the profile storage 216 of the computing device 102. Each of the user-specific platform profiles 204 may be unique for each computing device 102. The contents of the user-specific platform profiles 204 may be specified using a data modeling language such as HTML, XML, JSON, CBOR, YANG or any other known DMLs. The platform builder 202 may be configured to maintain a database of all platforms that the user may use in his or her inventory of computing devices 102. The platform builder 202 may identify target hosts involved in a distributed workload or a single host workload.

The stream builder 206 is configured to manage access to profile storage 216. The profile storage 216 may be embodied as a platform storage resource such as NAND-FLASH, NOR-FLASH, 3DXP, Intel® Optane™ memory, magnetic, optical, battery-backed-DRAM or other form of persistent storage. The stream builder 206 receives user-specific platform profiles 204 from the platform builder 202 by way of the VSB 214. The VSB 214 integrates with the platform builder 202 to act as a front-end to the stream builder 206. The stream builder 206 may verify the integrity of the user-specific platform profile 204 and authenticate the user-specific platform profile 204 prior storing the user-specific platform profile 204 in the profile storage 216. In one embodiment, the profile storage 216 may be configured not to store multiple redundant copies of a user-specific platform profile 204. That is, two or more user-specific platform profiles 204 may contain the same FPGA applications. As such, the profile storage 216 may reference users who are associated to the particular user-specific platform profile 204 configuration. The stream builder 206 may be configured to synthesize the one or more FPGA applications identified by the user-specific platform profile 204, generate a bit stream image 208 that is associated with the user-specific platform profile 204, and save that bit stream image 208 in the profile storage 216. The bit stream image 208 may represent the workload associated with the user-specific platform profile 204 to be executed by the computing device 102 with the FPGA 130.

The system scheduler 210 is configured to generate a virtual memory address 212 that is indicative of the one or more FPGA applications contained in the user-specific platform profile 204 in response to the stream builder 206 saving the bit stream image 208 in the profile storage 216. The system scheduler 210 may be embodied as a hypervisor, operating system, application, or other control structure of the computing device 102. The system scheduler 210 may specify the virtual memory address 212 of the computing device 102 for the bit stream image 208 that represents the workload associated with the user-specific platform profile 204 to be executed by the computing device 102.

The VFPGA controller 134 is configured to interface the profile storage 216 to page or swap in user-specific platform profiles 204 in part or in whole to dynamically configure the FPGA 130. The VFPGA controller 134 may use the PPCR 122 to facilitate a context switch that is specific to user-specific platform profiles 204. The VFPGA controller 134 may also use the PPCR 122 to decode segmentation within the FPGA 130 that contains one or more user-specific platform profile 204 realizations in the form of a bit stream image 208. The VFPGA controller 134 may map the virtual memory address 212 to a physical page of logical elements in the FPGA 130 as described below.

Figure 3:
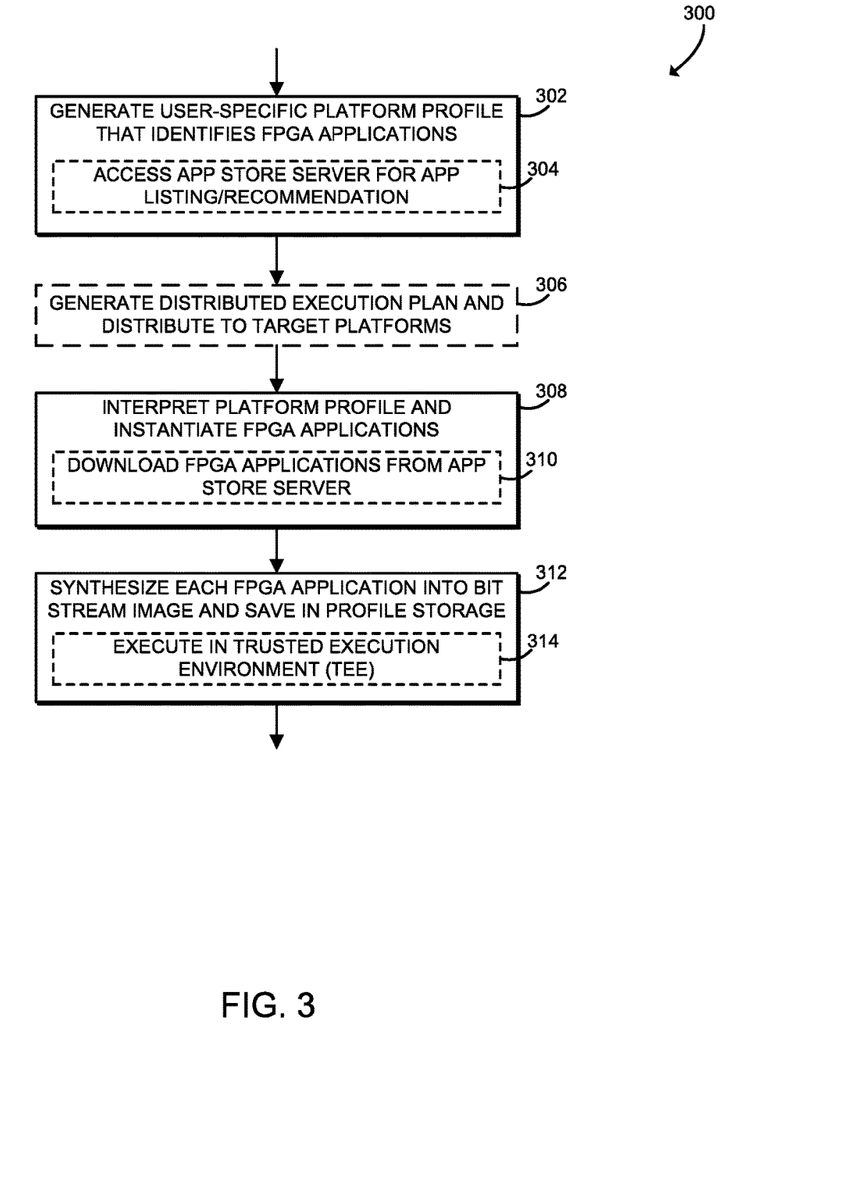
FIG. 3 is a simplified flow diagram of at least one embodiment of a method for dynamic FPGA re-configuration that may be executed by the computing device of FIGS. 1 and 2.

Referring now to FIG. 3, in use, the computing device 102 may execute a method 300 for generating bit stream image 208 data from a user-specific platform profile 204. It should be appreciated that, in some embodiments, the operations of the method 300 may be performed by one or more components of the environment 200 of the computing device 102 as shown in FIG. 2. The method begins in block 302, in which the computing device 102 generates a user-specific platform profile 204 that identifies one or more FPGA applications as described above. In some embodiments, in block 304, the computing device 102 may access an app store server 106 for FPGA application listings or recommendations. In some embodiments, the computing device 102 may access the app store 106 for traditional application listings or recommendations.

In some embodiments, in block 306, the computing device 102 may generate a distributed execution plan and distribute the execution plan to one or more target platforms. That is, the one or more FPGA applications identified by the user-specific platform profile 204 may be platform specific and the computing device 102 may identify and distribute the execution plan to platforms that may execute the one or more FPGA applications.

In block 308, the computing device 102 interprets the user-specific platform profile 204 and instantiates the one or more FPGA applications that are associated with the user-specific platform 204. Each FPGA application may be embodied as a register-transfer level (RTL) description of the application hardware. In some embodiments, in block 310, the computing device 102 may download the one or more FPGA applications from the app store server 106.

In block 312, the computing device 102 synthesizes each FPGA application associated with the user-specific platform profile 204 into a bit stream image 208 and saves the bit stream image 208 into a profile storage 216 as described above. Synthesizing the bit stream image includes compiling the RTL description of the FPGA application and generating a bit stream image 208 that may be executed with the FPGA 130. In some embodiments, in block 314, the computing device 102 may synthesize the bit stream image 208 in a trusted execution environment (TEE). After generating the bit stream image 208, the computing device 102 may utilize the FPGA 130 to execute the bit stream image 208 for accelerated performance of workloads as described above.

Figure 4A:
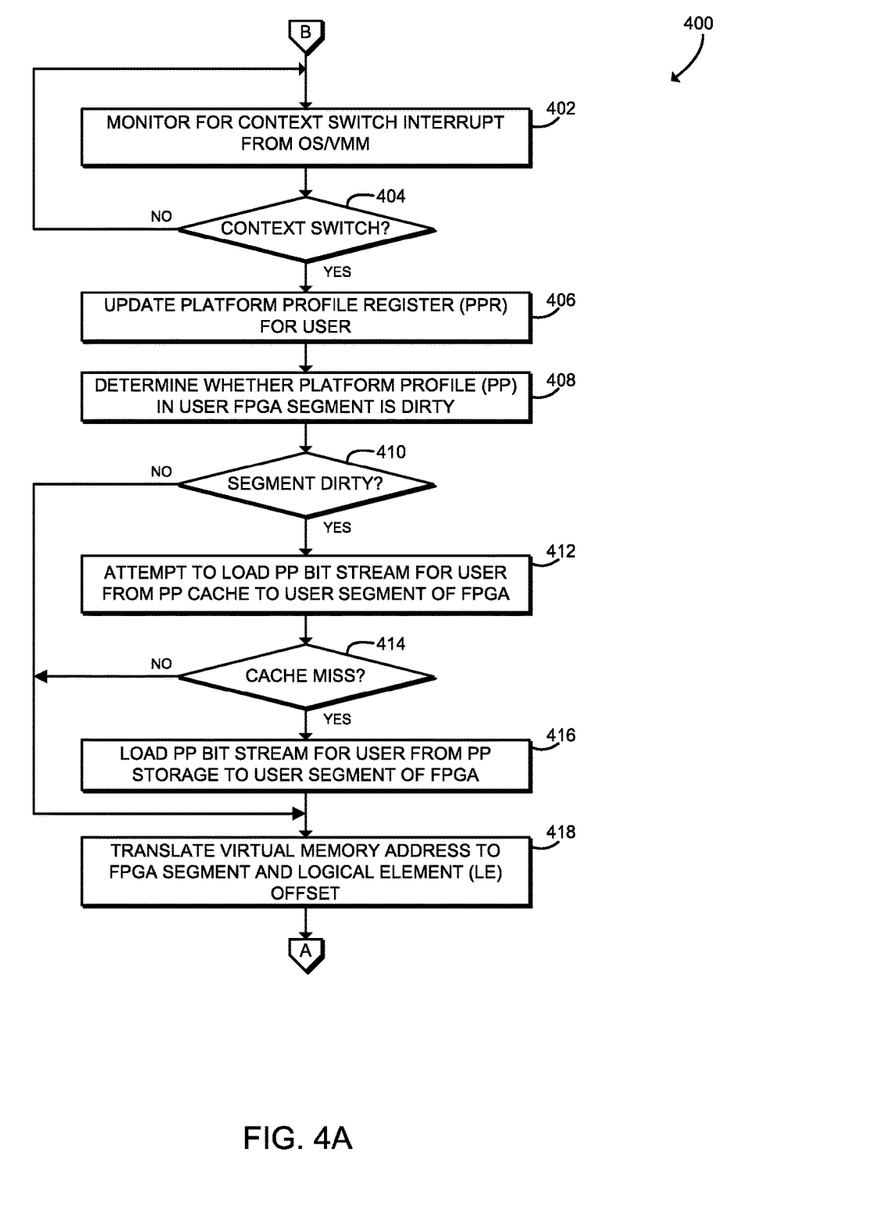
FIGS. 4A and 4B are a simplified flow diagram of at least one embodiment of a method for dynamic FPGA re-configuration that may be executed by the computing device of FIGS. 1 and 2.
Figure 4B:
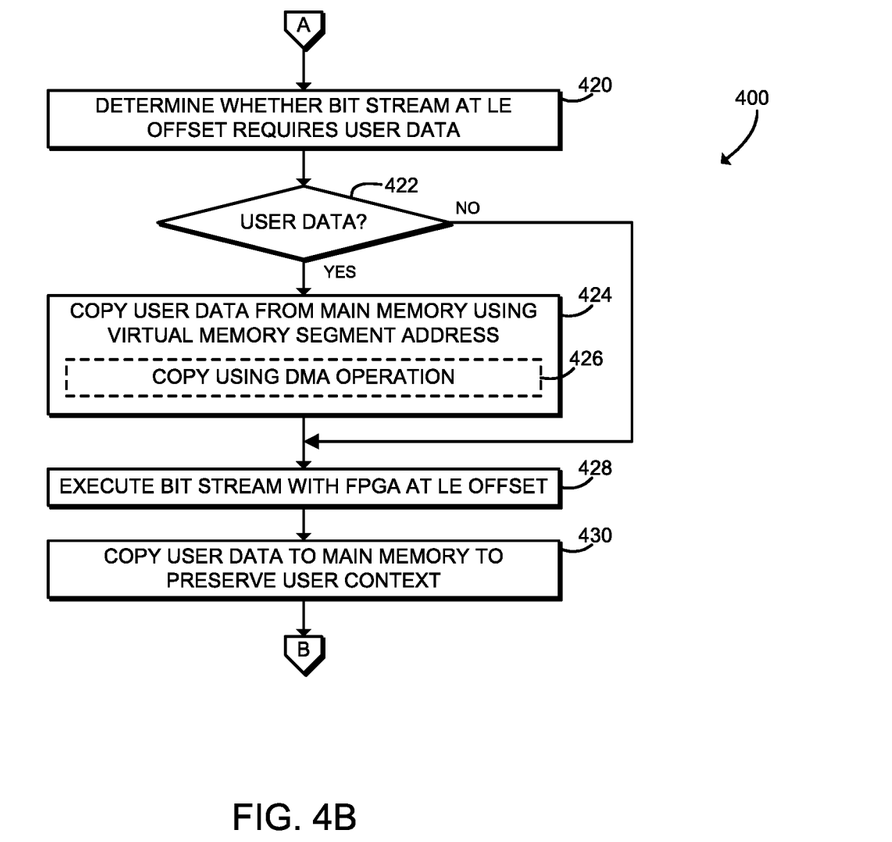

Referring now to FIGS. 4A and 4B, in use, the computing device 102 may execute a method 400 for dynamic FPGA 130 reconfiguration using a VFPGA controller 134. It should be appreciated that, in some embodiments, the operations of the method 400 may be performed by one or more components of the environment 200 of the computing device 102 as shown in FIG. 2. The method 400 begins in block 402, in which the computing device 102 monitors for a context switch interrupt from an operating system (OS) and/or virtual machine manager (VMM). The context switch interrupt may be received after completion of execution of a bit stream image 208 associated with a user-specific platform profile 204 to begin execution of a bit stream image 208 associated with a different user-specific platform profile 204. In block 404, the computing device 102 determines whether a context switch has been detected. If not, the method 400 loops back to block 402 to continue monitoring for a context switch interrupt from the OS and/or VMM. If the computing device 102 determines that there is a context switch, the method 400 advances to block 406.

In block 406, the computing device 102 updates a platform profile register (PPR) for each user-specific platform profile 204. The platform profile register identifies the user-specific platform profile 204 to be executed by the FPGA 130. The PPR may be updated by a scheduling component of the computing device 102 such as the operating system, hypervisor, or other control software.

In block 408, the VFPGA controller 134 of the computing device 102 determines whether the user-specific platform profile 204 in the user FPGA 130 segment is dirty. In block 410, the computing device 102 checks whether the segment is dirty. If the VFPGA controller 134 determines that the segment is not dirty, the method 400 branches ahead to block 418 to continue reconfiguring the FPGA 130 with the VFPGA controller 134, as described below. If the VFPGA controller 134 determines that the segment is dirty, the method 400 advances to block 412.

In block 412, the VFPGA 134 of the computing device 102 attempts to load the bit stream images 208 for each user-specific platform profile 204 from a platform profile cache to a user segment of the FPGA 130. The platform profile cache is loaded from the contents of the profile storage 216. The platform profile register may contain a reference to the user-specific platform profile 204 that the current user requires. In some embodiments, this may be implemented as a value in memory 126 that is DMA-ed in.

In block 414, the computing device 102 determines whether there is a cache miss in the platform profile cache. If there is no cache miss, the method 400 branches ahead to block 418 to continue reconfiguring the FPGA 130 with the VFPGA controller 134 as described below. If there is a cache miss, the method 400 advances to block 416.

In block 416, the VFPGA controller 134 of the computing device 102 loads the bit stream image 208 associated with the user-specific platform profile 204 that is saved in the profile storage 216 into the user segment of the FPGA 130. In some embodiments, when multiple users require the same or overlapping user-specific platform profiles, the VFPGA controller 134 ensures user specific context or user data is stored and re-stored as a part of the context switch to increase efficient bit stream utilization.

In block 418, the VFPGA controller 134 translates the virtual memory address 212 to a user FPGA 130 segment and logical element (LE) offset as described below. This translation primes the FPGA 130 to execute the bit stream image 208 associated with the user-specific platform profile 204 for the current user.

Referring now to FIG. 4B, in block 420, the computing device 102 determines whether the bit stream image 208 at the LE offset requires user data. The user data may be kept in memory 126 that may be connected to the FPGA 130 through a DMA channel. In block 422, the computing device 102 checks whether user data is required. If user data is not required, the method 400 branches ahead to block 428 to implement the FPGA 130 as described below. If user data is required, the method 400 advances to block 424.

In block 424, the VFPGA controller 134 copies user data from memory 126 using the virtual memory address. The VFPGA controller 134 may copy the user data to memory buffers of the FPGA 130 or other memory accessible to the FPGA 130. In some embodiments, in block 426, the VFPGA controller 134 may copy the user data from memory 126 by using a DMA operation.

In block 428, the VFPGA controller 134 executes the bit stream image 208 with the FPGA 130 at the LE offset. Thus, the FPGA 130 performs the user workload specified by the current user-specific platform profile 204. In block 430, the VFPGA controller 134 may copy user data to the memory 126 to preserve the user context. This improves the efficiency of the bit stream utilization by allowing the VFPGA controller 134 to quickly access the user data immediately when the system 100 is utilized to reconfigure the FPGA 130 again for the user. After block 430, the method 400 returns to block 402, shown in FIG. 4A, to continue monitoring for additional context switch interrupts.

Figure 5:
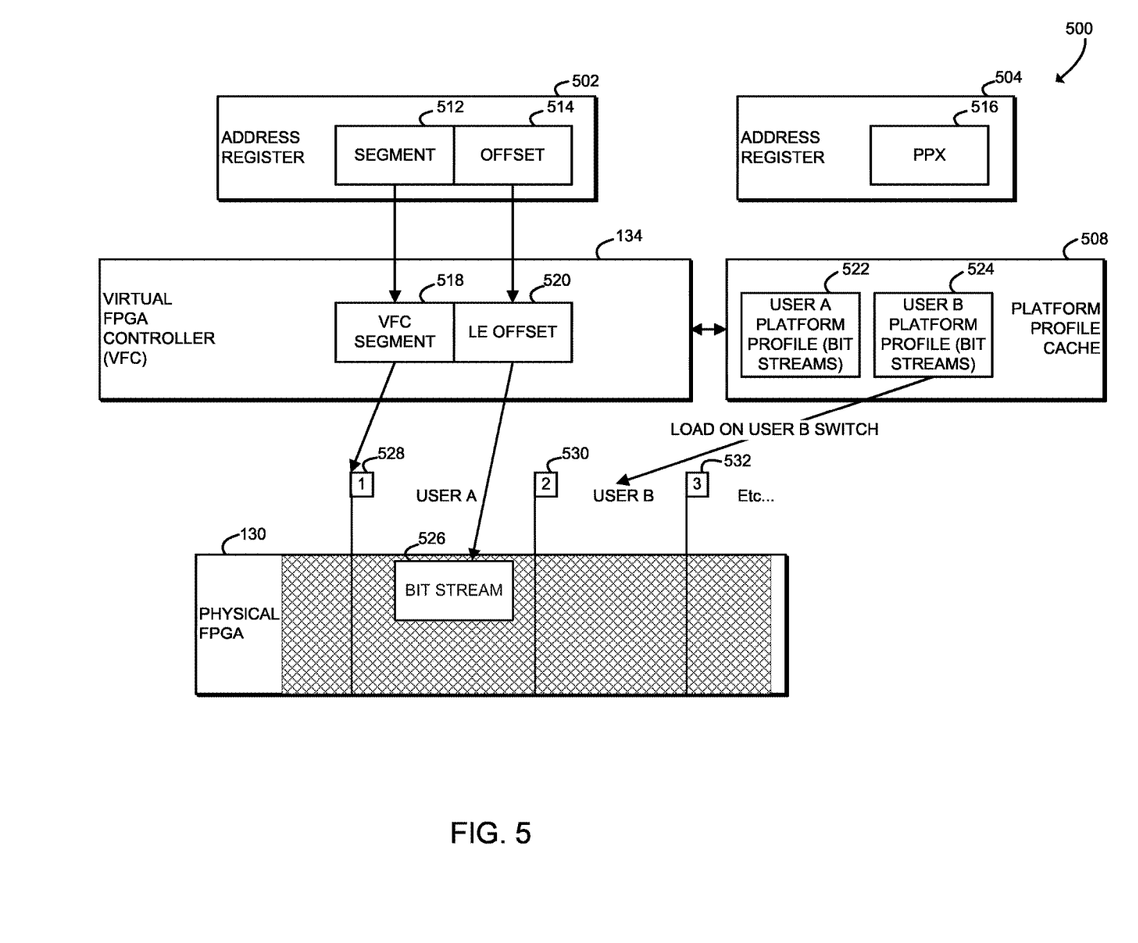
FIG. 5 is a simplified block diagram of an FPGA configuration that may be established by the computing device of FIGS. 1-2.

Referring now to FIG. 5, a diagram 500 illustrates one potential embodiment of an FPGA configuration that may be established by computing device 102. As shown, an address register 502 includes a segment 512 and an offset 514, an address register 504 identifies a bit stream image 208 for a user-specific platform profile 204 in the form of a profile register 516, a virtual FPGA controller (VFC) 134 determines a VFC segment 518 and a LE offset 520, a platform profile cache 508 stores a bit stream for a user A platform profile 522 and a bit stream for a user B platform profile 524, and a physical FPGA 130 includes a bit stream entry point 526 in a user A segment 528 as well as a user B segment 530 and a user C segment 532. In the illustrative embodiment, the diagram 500 shows only two user platform profiles 522, 524, but it should be recognized that any number of user platform profiles may be stored in the platform profile cache 508. Similarly, although only three separate user segments 528, 530, 532 of the FPGA 130 are shown, there may be any number of user segments of the physical FPGA 130.

The segment 512 and offset 514 of the address register 502 may be generated by the system scheduler 210 to be accessed by the VFC 134 upon a context switch. The profile register 516 of the address register 504 may reference a profile generated by the stream builder 206 and stored in the profile storage 216 as described above. The VFC 134 may access the address registers 502 and 504 to determine the VFC segment 518 and LE offset 520. The VFC 134 may load the contents of each profile 522 and 524 into the platform profile cache 508 from the profile storage 216. Accordingly, the VFC 134 may access the contents of the address registers 502 and 504 to fill each user platform profile 522 and 524.

In the embodiment shown, the VFC 134 translates the virtual address segment 512 and offset 514 into a VFC segment 518 and LE offset 520 within a user segment 528 of the physical FPGA 130 that contains the current user's platform profile (e.g., the user A platform profile bit stream 522). The physical FPGA 130 may then execute the contents of the user segment 528, for example starting at the entry point 526.

As described above, the system 100 may receive a context switch for a different user (e.g., user B) after executing the contents of user segment 528 for the user A platform profile 522. If the context switch results in a virtual memory address for user B and the platform profile for that user B's VFC segment 518 is dirty, then the VFC 134 will swap and/or page the user B platform profile 524 into the FPGA 130 user B segment 530 prior to an address translation by the VFC 134 to an address in the physical FPGA 130. Furthermore, a cache miss in the platform profile cache 508 may result in an access to the profile storage 216 using the address register 504.

It should be appreciated that, in some embodiments, the methods 300 and/or 400 may be embodied as various instructions stored on a computer-readable media, which may be executed by the processor 120, the I/O subsystem 124, the FPGA 130, and/or other components of the computing device 102 to cause the computing device 102 to perform the respective method 300 and/or 400 respectively. The computer-readable media may be embodied as any type of media capable of being read by the computing device 102 including, but not limited to, the memory 126, the data storage device 128, firmware devices, other memory or data storage devices of the computing device 102, portable media readable by a peripheral device 136 of the computing device 102, and/or other media.

EXAMPLES

Illustrative examples of the technologies disclosed herein are provided below. An embodiment of the technologies may include any one or more, and any combination of, the examples described below.

Example 1 includes a computing device for field-programmable gate array (FPGA) processing, the computing device comprising: a field-programmable gate array (FPGA); a platform builder to generate a user-specific platform profile that identifies one or more FPGA applications to be instantiated; a stream builder to (i) synthesize each FPGA application of the one or more FPGA applications identified by the user-specific platform profile to generate a bit stream image that is associated with the user-specific platform profile, and (ii) save the bit stream image in a profile storage of the computing device; a system scheduler to generate a virtual memory address that is indicative of the one or more FPGA applications in response to saving of the bit stream image; and a virtual FPGA (VFPGA) controller to translate the virtual memory address to a user segment of the FPGA and a logical element (LE) offset within the user segment, wherein the FPGA is to execute the bit stream image associated with the user-specific platform profile with the FPGA at the LE offset.

Example 2 includes the subject matter of Example 1, and wherein to generate the user-specific platform profile comprises to access an application store server to receive one or more application listings or recommendations.

Example 3 includes the subject matter of any of Examples 1 and 2, and wherein to instantiate the one or more FPGA applications for the user-specific platform profile comprises to download the one or more FPGA applications from the application store server.

Example 4 includes the subject matter of any of Examples 1-3, and wherein each FPGA application of the one or more FPGA applications comprises a register transfer level (RTL) definition of the FPGA application.

Example 5 includes the subject matter of any of Examples 1-4, and further comprising a trusted execution environment, wherein the trusted execution environment comprises the stream builder and the profile storage.

Example 6 includes the subject matter of any of Examples 1-5, and wherein the system scheduler is further to generate a context switch interrupt in response to generation of the virtual memory address; and the VFPGA controller is further to (i) detect the context switch interrupt and (ii) update a platform profile register to identify the user-specific platform profile in response to a detection of the context switch interrupt.

Example 7 includes the subject matter of any of Examples 1-6, and wherein the system scheduler comprises an operating system or a virtual machine monitor.

Example 8 includes the subject matter of any of Examples 1-7, and wherein the VFPGA controller comprises a hardware component of the computing device.

Example 9 includes the subject matter of any of Examples 1-8, and wherein the VFPGA is further to: (i) determine whether the bit stream image associated with the user-specific platform profile in the user segment of the FPGA is dirty in response to generation of the virtual memory address, and (ii) load the bit stream image associated with the user-specific platform profile from a platform profile cache to the user segment of the FPGA in response to a determination the user segment of the FPGA is dirty; and to execute the bit stream image comprises to execute the bit stream image in response to loading of the bit stream image.

Example 10 includes the subject matter of any of Examples 1-9, and wherein the VFPGA controller is further to determine whether a cache miss occurred in response to the loading of the bit stream image from the platform profile cache; and load the bit stream image associated with the user-specific platform profile from the profile storage to the user-segment of the FPGA in response to a determination a cache miss occurred.

Example 11 includes the subject matter of any of Examples 1-10, and wherein the VFPGA controller comprises a hardware component of the computing device.

Example 12 includes the subject matter of any of Examples 1-11, and wherein the VFPGA controller is further to determine whether the bit stream image at the LE offset requires user data in response to translation of the virtual memory address; and copy user data from a main memory of the computing device using a virtual memory segment address of the virtual memory address in response to a determination that the bit stream image at the LE offset requires user data.

Example 13 includes the subject matter of any of Examples 1-12, and wherein to copy user data from the main memory comprises to perform a direct memory access (DMA) operation.

Example 14 includes the subject matter of any of Examples 1-13, and wherein the VFPGA controller is further to copy user data to the main memory to preserve a user context in response to an execution of the bit stream image associated with the user-specific platform profile with the FPGA at the LE offset.

Example 15 includes the subject matter of any of Examples 1-14, and wherein the VFPGA controller comprises a hardware component of the computing device.

Example 16 includes a method for field-programmable gate array (FPGA) processing, the method comprising: generating, by a computing device, a user-specific platform profile that identifies one or more FPGA applications to be instantiated; synthesizing, by the computing device, each FPGA application of the one or more FPGA applications identified by the user-specific platform profile to generate a bit stream image that is associated with the user-specific platform profile; saving, by the computing device, the bit stream image in a profile storage of the computing device; generating, by the computing device, a virtual memory address that is indicative of the one or more FPGA applications in response to saving the bit stream image; translating, by a virtual field-programmable gate array (VFPGA) controller of the computing device, the virtual memory address to a user segment of a FPGA of the computing device and a logical element (LE) offset within the user segment; and executing, by the FPGA, the bit stream image associated with the user-specific platform profile at the LE offset.

Example 17 includes the subject matter of Example 16, and wherein generating the user-specific platform profile comprises accessing an application store server to receive one or more application listings or recommendations.

Example 18 includes the subject matter of any of Examples 16 and 17, and wherein instantiating the one or more FPGA applications for the user-specific platform profile comprises downloading the one or more FPGA applications from the application store server.

Example 19 includes the subject matter of any of Examples 16-18, and wherein each FPGA application of the one or more FPGA applications comprises a register transfer level (RTL) definition of the FPGA application.

Example 20 includes the subject matter of any of Examples 16-19, and wherein synthesizing each FPGA application of the one or more FPGA applications comprises synthesizing, by a trusted execution environment of the computing device, each FPGA application of the one or more FPGA applications; and saving the bit stream image comprises saving, by the trusted execution environment, the bit stream image in a secure storage of the trusted execution environment.

Example 21 includes the subject matter of any of Examples 16-20, and further comprising: detecting, by the VFPGA controller, a context switch interrupt generated by a system scheduler of the computing device, wherein the context switch interrupt is generated in response to generating the virtual memory address; and updating, by the VFPGA controller, a platform profile register to identify the user-specific platform profile in response to detecting the context switch interrupt.

Example 22 includes the subject matter of any of Examples 16-21, and wherein the system scheduler comprises an operating system or a virtual machine monitor.

Example 23 includes the subject matter of any of Examples 16-22, and wherein the VFPGA controller comprises a hardware component of the computing device.

Example 24 includes the subject matter of any of Examples 16-23, and further comprising: determining, by the VFPA controller, whether the bit stream image associated with the user-specific platform profile in the user segment of the FPGA is dirty in response to generating the virtual memory address; and loading, by the VFPA controller, the bit stream image associated with the user-specific platform profile from a platform profile cache to the user segment of the FPGA in response to determining the user segment of the FPGA is dirty, wherein executing the bit stream image comprises executing the bit stream image in response to loading of the bit stream image.

Example 25 includes the subject matter of any of Examples 16-24, and further comprising: determining, by the VFPGA controller, whether a cache miss occurred in response to loading the bit stream image from the platform profile cache; and loading the bit stream image associated with the user-specific platform profile from the profile storage to the user segment of the FPGA in response to determining that a cache miss occurred.

Example 26 includes the subject matter of any of Examples 16-25, and wherein the VFPGA controller comprises a hardware component of the computing device.

Example 27 includes the subject matter of any of Examples 16-26, and further comprising: determining, by the VFPGA controller, whether the bit stream image at the LE offset requires user data in response to translating the virtual memory address; and copying, by the VFPGA controller, user data from a main memory of the computing device using a virtual memory segment address of the virtual memory address in response to determining that the bit stream image at the LE offset requires user data.

Example 28 includes the subject matter of any of Examples 16-27, and wherein copying the user data from the main memory comprises performing a direct memory access (DMA) operation.

Example 29 includes the subject matter of any of Examples 16-28, and further comprising copying, by the VFPGA controller, user data to the main memory to preserve a user context in response to executing the bit stream image associated with the user-specific platform profile at the LE offset.

Example 30 includes the subject matter of any of Examples 16-29, and wherein the VFPGA controller comprises a hardware component of the computing device.

Example 31 includes a computing device comprising: a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for field-programmable gate array (FPGA) processing, the computing device comprising: means for generating a user-specific platform profile that identifies one or more FPGA applications to be instantiated; means for synthesizing each FPGA application of the one or more FPGA applications identified by the user-specific platform profile to generate a bit stream image that is associated with the user-specific platform profile; means for saving the bit stream image in a profile storage of the computing device; means for generating a virtual memory address that is indicative of the one or more FPGA applications in response to saving the bit stream image; means for translating, by a virtual field-programmable gate array (VFPGA) controller of the computing device, the virtual memory address to a user segment of a FPGA of the computing device and a logical element (LE) offset within the user segment; and means for executing, by the FPGA, the bit stream image associated with the user-specific platform profile at the LE offset.

Example 35 includes the subject matter of Example 34, and wherein the means for generating the user-specific platform profile comprises means for accessing an application store server to receive one or more application listings or recommendations.

Example 36 includes the subject matter of any of Examples 34 and 35, and wherein the means for instantiating the one or more FPGA applications for the user-specific platform profile comprises means for downloading the one or more FPGA applications from the application store server.

Example 37 includes the subject matter of any of Examples 34-36, and wherein each FPGA application of the one or more FPGA applications comprises a register transfer level (RTL) definition of the FPGA application.

Example 38 includes the subject matter of any of Examples 34-37, and wherein: the means for synthesizing each FPGA application of the one or more FPGA applications comprises means for synthesizing, by a trusted execution environment of the computing device, each FPGA application of the one or more FPGA applications; and the means for saving the bit stream image comprises means for saving, by the trusted execution environment, the bit stream image in a secure storage of the trusted execution environment.

Example 39 includes the subject matter of any of Examples 34-38, and further comprising: means for detecting, by the VFPGA controller, a context switch interrupt generated by a system scheduler of the computing device, wherein the context switch interrupt is generated in response to generating the virtual memory address; and means for updating, by the VFPGA controller, a platform profile register to identify the user-specific platform profile in response to detecting the context switch interrupt.

Example 40 includes the subject matter of any of Examples 34-39, and wherein the system scheduler comprises an operating system or a virtual machine monitor.

Example 41 includes the subject matter of any of Examples 34-40, and wherein the VFPGA controller comprises a hardware component of the computing device.

Example 42 includes the subject matter of any of Examples 34-41, and further comprising: means for determining, by the VFPA controller, whether the bit stream image associated with the user-specific platform profile in the user segment of the FPGA is dirty in response to generating the virtual memory address; and means for loading, by the VFPA controller, the bit stream image associated with the user-specific platform profile from a platform profile cache to the user segment of the FPGA in response to determining the user segment of the FPGA is dirty, wherein the means for executing the bit stream image comprises means for executing the bit stream image in response to loading of the bit stream image.

Example 43 includes the subject matter of any of Examples 34-42, and further comprising: means for determining, by the VFPGA controller, whether a cache miss occurred in response to loading the bit stream image from the platform profile cache; and means for loading the bit stream image associated with the user-specific platform profile from the profile storage to the user segment of the FPGA in response to determining that a cache miss occurred.

Example 44 includes the subject matter of any of Examples 34-43, and wherein the VFPGA controller comprises a hardware component of the computing device.

Example 45 includes the subject matter of any of Examples 34-44, and further comprising: means for determining, by the VFPGA controller, whether the bit stream image at the LE offset requires user data in response to translating the virtual memory address; and means for copying, by the VFPGA controller, user data from a main memory of the computing device using a virtual memory segment address of the virtual memory address in response to determining that the bit stream image at the LE offset requires user data.

Example 46 includes the subject matter of any of Examples 34-45, and wherein the means for copying the user data from the main memory comprises means for performing a direct memory access (DMA) operation.

Example 47 includes the subject matter of any of Examples 34-46, and further comprising means for copying, by the VFPGA controller, user data to the main memory to preserve a user context in response to executing the bit stream image associated with the user-specific platform profile at the LE offset.

Example 48 includes the subject matter of any of Examples 34-47, and wherein the VFPGA controller comprises a hardware component of the computing device.

The invention claimed is:

1. A computing device for field-programmable gate array (FPGA) processing, the computing device comprising:
a field-programmable gate array (FPGA);
a platform builder to generate a user-specific platform profile that identifies one or more FPGA applications to be instantiated;
a stream builder to (i) synthesize each FPGA application of the one or more FPGA applications identified by the user-specific platform profile to generate a bit stream image that is associated with the user-specific platform profile, and (ii) save the bit stream image in a profile storage of the computing device;
a system scheduler to generate a virtual memory address that is indicative of the one or more FPGA applications in response to saving of the bit stream image; and
a virtual FPGA (VFPGA) controller to translate the virtual memory address to a user segment of the FPGA and a logical element (LE) offset within the user segment,
wherein the FPGA is to execute the bit stream image associated with the user-specific platform profile with the FPGA at the LE offset.

2. The computing device of claim 1, wherein to generate the user-specific platform profile comprises to access an application store server to receive one or more application listings or recommendations.

3. The computing device of claim 2, wherein to instantiate the one or more FPGA applications for the user-specific platform profile comprises to download the one or more FPGA applications from the application store server.

4. The computing device of claim 1, wherein each FPGA application of the one or more FPGA applications comprises a register transfer level (RTL) definition of the FPGA application.

5. The computing device of claim 1, further comprising a trusted execution environment, wherein the trusted execution environment comprises the stream builder and the profile storage.

6. The computing device of claim 1, wherein:
the system scheduler is further to generate a context switch interrupt in response to generation of the virtual memory address; and
the VFPGA controller is further to (i) detect the context switch interrupt and (ii) update a platform profile register to identify the user-specific platform profile in response to a detection of the context switch interrupt.

7. The computing device of claim 6, wherein the system scheduler comprises an operating system or a virtual machine monitor.

8. The computing device of claim 1, wherein:
the VFPGA is further to: (i) determine whether the bit stream image associated with the user-specific platform profile in the user segment of the FPGA is dirty in response to generation of the virtual memory address, and (ii) load the bit stream image associated with the user-specific platform profile from a platform profile cache to the user segment of the FPGA in response to a determination the user segment of the FPGA is dirty; and
to execute the bit stream image comprises to execute the bit stream image in response to loading of the bit stream image.

9. The computing device of claim 8, wherein the VFPGA controller is further to:
determine whether a cache miss occurred in response to the loading of the bit stream image from the platform profile cache; and
load the bit stream image associated with the user-specific platform profile from the profile storage to the user-segment of the FPGA in response to a determination a cache miss occurred.

10. The computing device of claim 1, wherein the VFPGA controller is further to:
determine whether the bit stream image at the LE offset requires user data in response to translation of the virtual memory address; and
copy user data from a main memory of the computing device using a virtual memory segment address of the virtual memory address in response to a determination that the bit stream image at the LE offset requires user data.

11. The computing device of claim 10, wherein the VFPGA controller is further to copy user data to the main memory to preserve a user context in response to an execution of the bit stream image associated with the user-specific platform profile with the FPGA at the LE offset.

12. The computing device of claim 1, wherein the VFPGA controller comprises a hardware component of the computing device.

13. A method for field-programmable gate array (FPGA) processing, the method comprising:
generating, by a computing device, a user-specific platform profile that identifies one or more FPGA applications to be instantiated;
synthesizing, by the computing device, each FPGA application of the one or more FPGA applications identified by the user-specific platform profile to generate a bit stream image that is associated with the user-specific platform profile;
saving, by the computing device, the bit stream image in a profile storage of the computing device;
generating, by the computing device, a virtual memory address that is indicative of the one or more FPGA applications in response to saving the bit stream image;
translating, by a virtual field-programmable gate array (VFPGA) controller of the computing device, the virtual memory address to a user segment of a FPGA of the computing device and a logical element (LE) offset within the user segment; and
executing, by the FPGA, the bit stream image associated with the user-specific platform profile at the LE offset.

14. The method of claim 13, wherein generating the user-specific platform profile comprises accessing an application store server to receive one or more application listings or recommendations.

15. The method of claim 13, wherein each FPGA application of the one or more FPGA applications comprises a register transfer level (RTL) definition of the FPGA application.

16. The method of claim 13, further comprising:
detecting, by the VFPGA controller, a context switch interrupt generated by a system scheduler of the computing device, wherein the context switch interrupt is generated in response to generating the virtual memory address; and
updating, by the VFPGA controller, a platform profile register to identify the user-specific platform profile in response to detecting the context switch interrupt.

17. The method of claim 13, further comprising:
determining, by the VFPA controller, whether the bit stream image associated with the user-specific platform profile in the user segment of the FPGA is dirty in response to generating the virtual memory address; and loading, by the VFPA controller, the bit stream image associated with the user-specific platform profile from a platform profile cache to the user segment of the FPGA in response to determining the user segment of the FPGA is dirty, wherein executing the bit stream image comprises executing the bit stream image in response to loading of the bit stream image.

18. The method of claim 13, wherein the VFPGA controller comprises a hardware component of the computing device.

19. One or more non-transitory, machine readable storage media comprising a plurality of instructions that in response to being executed cause a computing device to:

generate a user-specific platform profile that identifies one or more FPGA applications to be instantiated;

synthesize each FPGA application of the one or more FPGA applications identified by the user-specific platform profile to generate a bit stream image that is associated with the user-specific platform profile;

save the bit stream image in a profile storage of the computing device;

generate a virtual memory address that is indicative of the one or more FPGA applications in response to saving the bit stream image;

translate, by a virtual field-programmable gate array (VFPGA) controller of the computing device, the virtual memory address to a user segment of a FPGA of the computing device and a logical element (LE) offset within the user segment; and execute, by the FPGA, the bit stream image associated with the user-specific platform profile at the LE offset.

20. The one or more non-transitory, machine readable storage media of claim 19, wherein to generate the user-specific platform profile comprises to access an application store server to receive one or more application listings or recommendations.

21. The one or more non-transitory, machine readable storage media of claim 19, wherein each FPGA application of the one or more FPGA applications comprises a register transfer level (RTL) definition of the FPGA application.

22. The one or more non-transitory, machine readable storage media of claim 19, further comprising a plurality of instructions that in response to being executed cause the computing device to:

detect, by the VFPGA controller, a context switch interrupt generated by a system scheduler of the computing device, wherein the context switch interrupt is generated in response to generating the virtual memory address; and update, by the VFPGA controller, a platform profile register to identify the user-specific platform profile in response to detecting the context switch interrupt.

23. The one or more non-transitory, machine readable storage media of claim 19, further comprising a plurality of instructions that in response to being executed cause the computing device to:

determine, by the VFPA controller, whether the bit stream image associated with the user-specific platform profile in the user segment of the FPGA is dirty in response to generating the virtual memory address; and load, by the VFPA controller, the bit stream image associated with the user-specific platform profile from a platform profile cache to the user segment of the FPGA in response to determining the user segment of the FPGA is dirty, wherein to execute the bit stream image comprises to execute the bit stream image in response to loading of the bit stream image.

24. The one or more non-transitory, machine readable storage media of claim 19, wherein the VFPGA controller comprises a hardware component of the computing device.

* * * * *